(12) United States Patent
Ryu et al.

(10) Patent No.: US 9,988,989 B2
(45) Date of Patent: *Jun. 5, 2018

(54) METHOD FOR CONTROLLING OF VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 13 days.

This patent is subject to a terminal disclaimer.

(21) Appl. No.: 15/258,052

(22) Filed: Sep. 7, 2016

(65) Prior Publication Data

US 2017/0167403 A1  Jun. 15, 2017

(30) Foreign Application Priority Data

Dec. 10, 2015  (KR) ........................ 10-2015-0176329

(51) Int. Cl.
*F02D 13/02*  (2006.01)
*F01L 1/34*   (2006.01)
(Continued)

(52) U.S. Cl.
CPC ......... *F02D 13/0215* (2013.01); *B60W 10/06* (2013.01); *B60W 20/10* (2013.01);
(Continued)

(58) Field of Classification Search
CPC ......... F01L 1/047; F01L 1/34; F01L 13/0015; F01L 2013/111; F02D 13/0215;
(Continued)

(56) References Cited

U.S. PATENT DOCUMENTS

| 5,080,055 A * | 1/1992 | Komatsu | ................... | F01L 1/08 |
|---|---|---|---|---|
| | | | | 123/90.11 |
| 2005/0087158 A1* | 4/2005 | Tanei | .................... | F02D 35/027 |
| | | | | 123/90.15 |

(Continued)

FOREIGN PATENT DOCUMENTS

| JP | 2006-46293 A | 2/2006 |
|---|---|---|
| JP | 2006-336659 A | 12/2006 |

(Continued)

*Primary Examiner* — John Kwon
*Assistant Examiner* — Johnny H Hoang
(74) *Attorney, Agent, or Firm* — Brinks Gilson & Lione

(57) ABSTRACT

A method for controlling valve timing is provided for an engine including a continuous variable valve duration device disposed on an intake valve side, and a continuous variable valve duration device and continuous variable valve timing device disposed on an exhaust valve side. The method includes: classifying first, second, third, fourth, and fifth control regions depending on an engine speed and an engine load; applying a maximum duration to an intake valve and controlling a valve overlap in the first control region; applying the maximum duration to the intake valve and exhaust valve in the second control region; controlling a manifold absolute pressure (MAP) of an intake manifold to be maintained consistently in the third control region; controlling a wide open throttle valve (WOT) and retarding an exhaust valve opening (EVO) timing in the fourth control region; and controlling the WOT and retarding an intake valve closing (IVC) timing in the fifth control region.

8 Claims, 5 Drawing Sheets

(51) Int. Cl.
*B60W 10/06* (2006.01)
*F02D 41/26* (2006.01)
*B60W 20/10* (2016.01)
*F01L 1/047* (2006.01)
*F02D 41/00* (2006.01)
*F02M 35/104* (2006.01)
*F01L 1/053* (2006.01)
*F01L 13/00* (2006.01)

(52) U.S. Cl.
CPC ............... *F01L 1/047* (2013.01); *F01L 1/053* (2013.01); *F02D 13/0261* (2013.01); *F02D 41/0002* (2013.01); *F02D 41/26* (2013.01); *F02M 35/104* (2013.01); *F01L 1/34* (2013.01); *F01L 13/0015* (2013.01); *F01L 2001/0537* (2013.01); *F01L 2800/00* (2013.01); *F02D 2041/001* (2013.01); *F02D 2041/002* (2013.01); *F02D 2200/101* (2013.01); *Y02T 10/18* (2013.01); *Y02T 10/42* (2013.01); *Y10S 903/905* (2013.01)

(58) Field of Classification Search
CPC ............. F02D 13/0226; F02D 13/0261; F02D 2200/101; F02D 2200/1002; B60W 10/06; B60W 20/10; F02M 35/104
USPC ......... 123/321–323, 347–348; 701/102, 103, 701/105, 106, 115
See application file for complete search history.

(56) References Cited

U.S. PATENT DOCUMENTS

| | | | |
|---|---|---|---|
| 2007/0181096 A1* | 8/2007 | Wagner | F02D 13/0261 123/299 |
| 2009/0084333 A1* | 4/2009 | Cleary | F02D 13/0207 123/90.17 |
| 2017/0167394 A1* | 6/2017 | Ryu | F02D 13/0215 |
| 2017/0167398 A1* | 6/2017 | Ryu | F02D 41/0002 |
| 2017/0167399 A1* | 6/2017 | Ryu | F02D 13/0215 |
| 2017/0167403 A1* | 6/2017 | Ryu | B60W 10/06 |
| 2017/0167404 A1* | 6/2017 | Ryu | F02D 13/0215 |
| 2017/0167405 A1* | 6/2017 | Ryu | F01L 13/0015 |
| 2017/0167414 A1* | 6/2017 | Ryu | F02B 37/00 |
| 2017/0234243 A1* | 8/2017 | Ryu | F02D 13/0234 123/350 |
| 2017/0268437 A1* | 9/2017 | Ryu | F01L 1/047 |

FOREIGN PATENT DOCUMENTS

| | | |
|---|---|---|
| KR | 10-0321206 B1 | 1/2002 |
| KR | 10-2009-0013007 A | 2/2009 |
| WO | 2013/171830 A1 | 11/2013 |

* cited by examiner

EVD map
(Unit : Crank angle)

EVO timing map
(Unit : Before BDC)

EVC timing map
(Unit : After TDC)

METHOD FOR CONTROLLING OF VALVE TIMING OF CONTINUOUS VARIABLE VALVE DURATION ENGINE

CROSS-REFERENCE TO RELATED APPLICATION

This application claims priority to and the benefit of Korean Patent Application No. 10-2015-0176329, filed Dec. 10, 2015, the entire contents of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a cylinder by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) may be controlled according to a rotational speed or load of an engine. Therefore, a continuous variable valve duration (CVVD) device controlling the opening duration of an intake valve and an exhaust valve of the engine and a continuous variable valve timing (CVVT) device controlling the opening and closing timing of the intake valve and the exhaust valve of the engine have been developed.

The CVVD device may control opening duration of the valve. In addition, the CVVT device may advance or retard the opening or closing timing of the valve in a state that the opening duration of the valve is fixed. That is, if the opening timing of the valve is determined, the closing timing is automatically determined according to the opening duration of the valve.

The above information disclosed in this Background section is only for enhancement of understanding of the background of the present disclosure and therefore it may contain information that does not form the prior art that is already known to a person of ordinary skill in the art.

SUMMARY

The present disclosure relates to a system and a method for controlling valve timing of a continuous variable valve duration engine that simultaneously controls duration and timing of the valve being equipped with a continuous variable valve duration device disposed on an intake valve side, and being equipped with a continuous variable valve duration device and continuous variable valve timing device disposed on an exhaust valve side.

A method for controlling valve timing provided with a continuous variable valve duration device disposed on an intake valve side, and with a continuous variable valve duration device and continuous variable valve timing device disposed on an exhaust valve side may include classifying a plurality of control regions depending on an engine speed and an engine load. The plurality of control regions may include: a first control region when the engine load is less than a first predetermined load; a second control region when the engine load is greater than or equal to the first predetermined load and less than a second predetermined load; a third control region when the engine load is greater than or equal to the second predetermined load and less than a third predetermined load; a fourth control region when the engine load is greater than or equal to the second predetermined load and the engine speed is less than a predetermined speed; and a fifth control region when the engine load is greater than or equal to the third predetermined load and the engine speed is greater than or equal to the predetermined speed.

The method for controlling valve timing further includes: applying a maximum duration to an intake valve and controlling a valve overlap by using the exhaust valve in the first control region; applying the maximum duration to the intake valve and exhaust valve in the second control region; controlling a manifold absolute pressure (MAP) of an intake manifold to be maintained consistently in the third control region; controlling a wide open throttle valve (WOT) and retarding an exhaust valve opening (EVO) timing in the fourth control region; and controlling a wide open throttle valve (WOT) and retarding an intake valve closing (IVC) timing.

If the control region is in the first control region, then the controller may fix the EVO timing and controls an exhaust valve closing (EVC) timing to be set up at a maximum value as much as combust stability is maintained so as to limit a valve overlap.

If the control region is in the second control region, then the controller may control an exhaust valve closing (EVC) timing to be retarded as the engine load is increased in order that the exhaust valve reaches the maximum duration.

If the control region is in the third control region, then the controller may advance both an exhaust valve closing (EVC) timing and the intake valve closing (IVC) timing in order to maintain the MAP consistently when the engine load is increased.

A system for controlling valve timing of a continuous variable valve duration engine may include: a data detector detecting data related to a running state of the vehicle; a camshaft position sensor detecting a position of a camshaft; an intake continuous variable valve duration (CVVD) device controlling an opening time of an intake valve of the engine; an exhaust continuous variable valve duration (CVVD) device controlling an opening time of an exhaust valve of the engine; an exhaust continuous variable valve timing (CVVT) device controlling an opening and closing timing of the exhaust valve of the engine; and a controller configured to classify the running state of the vehicle into a plurality of control regions depending on an engine speed and an engine load based on signals from the data detector and camshaft position sensor and configured to control the intake CVVD device, the exhaust CVVD device, and the exhaust CVVT device according to the control regions.

The a plurality of control regions may include: a first control region when the engine load is less than a first predetermined load; a second control region when the engine load is greater than or equal to the first predetermined load and less than a second predetermined load; a third control region when the engine load is greater than or equal to the second predetermined load and less than a third predetermined load; a fourth control region when the engine load is greater than or equal to the second predetermined load and the engine speed is less than a predetermined speed; and a fifth control region when the engine load is greater than or equal to the third predetermined load and the engine speed is greater than or equal to the predetermined speed.

The controller may apply a maximum duration to the intake valve and control a valve overlap by using the exhaust valve in the first control region, apply the maximum duration to the intake and exhaust valves in the second control region. The controller may control a manifold absolute pressure (MAP) in an intake manifold to be maintained consistently in the third control region, may control a wide open throttle valve (WOT) and control an exhaust valve opening (EVO) timing to be retarded in the fourth control region. The controller may control a wide open throttle valve (WOT) and control an intake valve closing (IVC) timing to be retarded in the fifth control region.

The controller may fix the EVO timing and control an exhaust valve closing (EVC) timing to be set up at a maximum value as much as combustion stability is maintained so as to limit a valve overlap in the first control region.

The controller may control an exhaust valve closing (EVC) timing to be retarded as the engine load is increased in order that the exhaust valve reaches the maximum duration in the second control region.

The controller may advance both an exhaust valve closing (EVC) timing and the intake valve closing (IVC) timing in order to maintain the MAP consistent when the engine load is increased in the third control region.

As described above, duration and timing of the continuous variable valve are simultaneously controlled, so the engine may be controlled under desirable conditions.

That is, since opening timing and closing timing of the intake valve and the exhaust valve are appropriately controlled, the fuel efficiency under a partial load condition and engine performance under a high load condition are enhanced. In addition, a starting fuel amount may be reduced by increasing a valid compression ratio, and exhaust gas may be reduced by shortening time for heating a catalyst.

Moreover, even if the continuously variable valve timing device is sipped, the power performance may be maintained with low cost.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, references being made to the accompanying drawings, in which.

Figure 1:
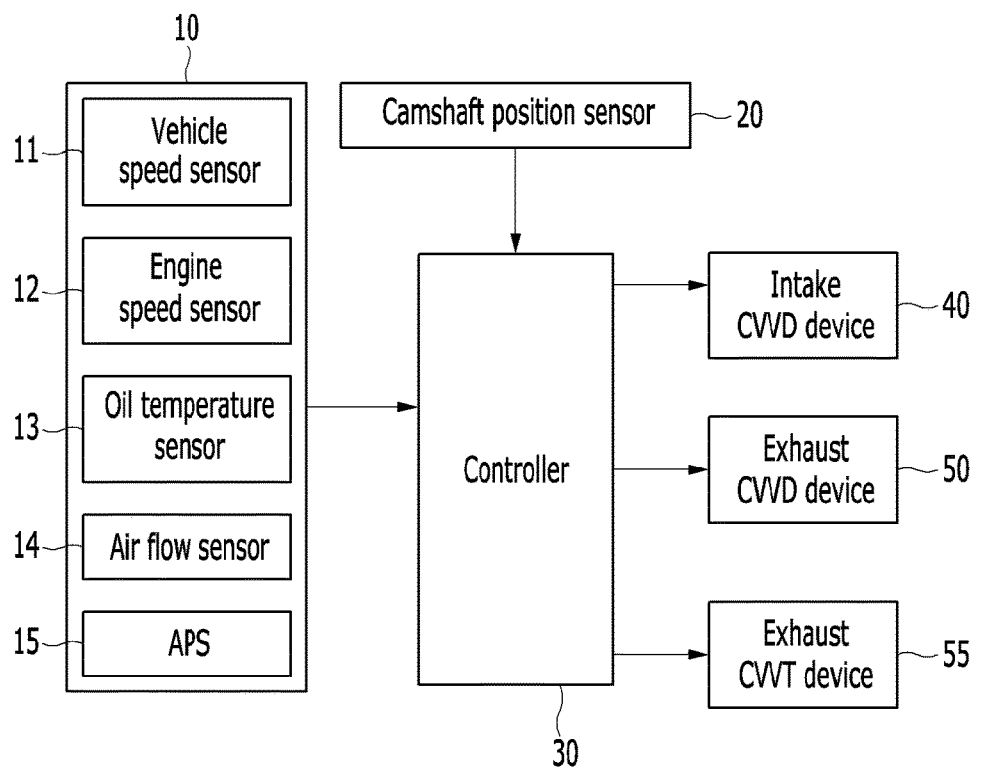
FIG. 1 is a schematic block diagram showing a system for controlling valve timing of a continuous variable valve duration engine according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

FIG. 1 is a schematic block diagram showing a system for controlling valve timing of a continuous variable valve duration engine according to one form of the present disclosure.

As shown in FIG. 1, a system for controlling valve timing of a continuous variable valve duration engine includes: a data detector 10, a camshaft position sensor 20, a controller 30, an intake continuous variable valve duration (CVVD) device 40, an exhaust continuous variable valve duration (CVVD) device 50, and an exhaust continuous variable valve timing (CVVT) device 55.

The data detector 10 detects data related to a running state of the vehicle for controlling the intake continuous variable valve duration (CVVD) device 40, the exhaust continuous variable valve duration (CVVD) device 50, and the exhaust continuous variable valve timing (CVVT) device 55, and the data detector 10 includes a vehicle speed sensor 11, an engine speed sensor 12, an oil temperature sensor 13, an air flow sensor 14, and an accelerator pedal position sensor (APS) 15, although other sensors may be employed.

The vehicle speed sensor 11 detects a vehicle speed, transmits a corresponding signal to the controller 30, and may be mounted at a wheel of the vehicle.

The engine speed sensor 12 detects a rotation speed of the engine from a change in phase of a crankshaft or camshaft, and transmits a corresponding signal to the controller 30.

The oil temperature sensor (OTS) 13 detects temperature of oil flowing through an oil control valve (OCV), and transmits a corresponding signal to the controller 30.

The oil temperature detected by the oil temperature sensor 13 may be determined by measuring a coolant temperature using a coolant temperature sensor mounted at a coolant passage of an intake manifold. Therefore, in one form, the oil temperature sensor 13 may include a coolant temperature sensor, and the oil temperature should be understood to include the coolant temperature The air flow sensor 14 detects an air amount drawn into the intake manifold, and transmits a corresponding signal to the controller 30.

The accelerator pedal position sensor (APS) 15 detects a degree in which a driver pushes an accelerator pedal, and transmits a corresponding signal to the controller 30. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake passage may be used instead of the accelerator pedal position sensor 15. Therefore, in one form, the accelerator pedal position sensor 15 may include a throttle valve position sensor, and the position value of the accelerator pedal should be understood to include an opening value of the throttle valve.

The camshaft position sensor 20 detects a change of a camshaft angle, and transmits a corresponding signal to the controller 30.

Figure 2:
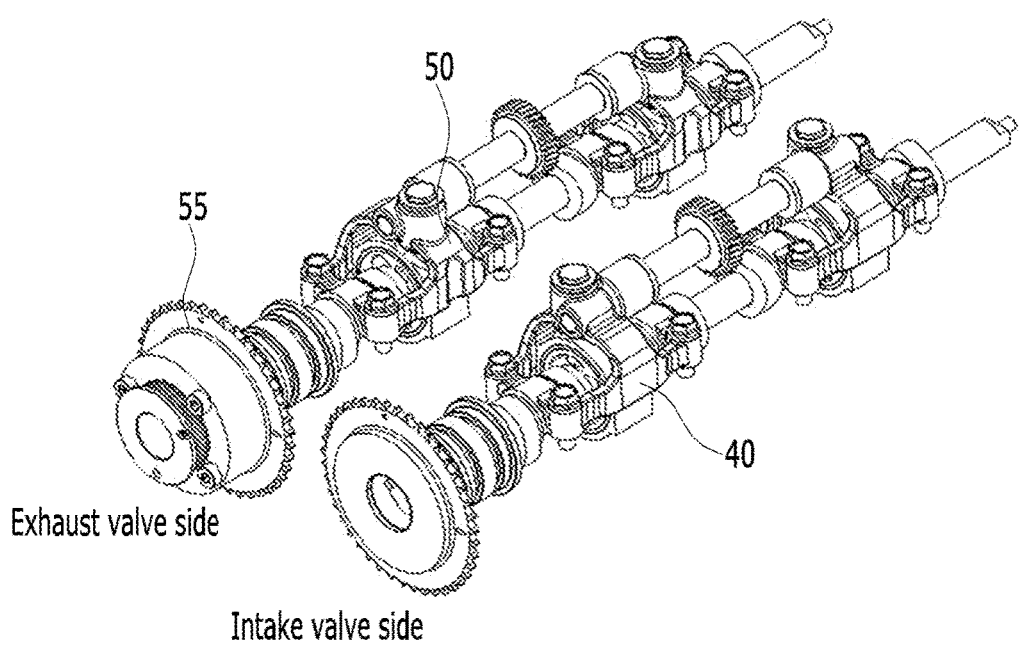
FIG. 2 is a perspective view showing a continuous variable valve duration device which is disposed on an intake valve side, and a continuous variable valve duration device and continuous variable valve timing device which is disposed on an exhaust valve side.

FIG. 2 is a perspective view showing a continuous variable valve duration device 40 which is disposed on an intake valve side, and a continuous variable valve duration device 50 and continuous variable valve timing device 55 which are disposed on an exhaust valve side;

As shown in FIG. 2, only the continuously variable valve duration (CVVD) device is assembled to the intake valve by a fixed cam, whereas the continuous variable valve duration device and the continuous variable valve timing are provided to the exhaust valve. Accordingly, timing of the intake valve opening (IVO) is fixed. For example, the IVO timing may be fixed at an angle of approximately 0 to 10 degrees before a top dead center (TDC) since a value of the IVO timing close to the top dead center is more advantageous on a fuel efficiency in almost control regions.

The intake continuous variable valve duration (CVVD) device 40 controls an opening time of an intake valve of the engine according to a signal from the controller 30, the exhaust continuous variable valve duration (CVVD) device 50 controls an opening time of an exhaust valve of the engine according to a signal from the controller 30.

The exhaust continuous variable valve timing (CVVT) device 55 controls opening and closing timing of the exhaust valve of the engine according to a signal from the controller 30.

The controller 30 may classify a plurality of control regions depending on an engine speed and an engine load based on signals from the data detector 10 and camshaft position sensor 20, and the controller 30 controls the intake CVVD devices 40, and the exhaust CVVD and CVVT devices 50 and 55 according to the control regions. Herein, the plurality of control regions may be classified into five regions.

The controller 30 applies a maximum duration to the intake valve and controls a valve overlap by using the exhaust valve in a first control region, applies the maximum duration to the intake and exhaust valves in a second control region, controls a manifold absolute pressure (MAP) in an intake manifold to be maintained consistently in a third control region, controls a wide open throttle valve (WOT) and controls an exhaust valve opening (EVO) timing to be retarded in a fourth control region, controls a wide open throttle valve (WOT) and controls an intake valve closing (IVC) timing to be retarded in a fifth control region.

For these purposes, the controller 30 may be implemented as at least one processor that is operated by a predetermined program, and the predetermined program may be programmed in order to perform each step of a method for controlling valve timing of a continuous variable valve duration engine.

Various forms described herein may be implemented within a recording medium that may be read by a computer or a similar device by using software, hardware, or a combination thereof.

For example, the hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

The software such as procedures and functions of the forms described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 3A to FIG. 5C.

Figure 3A:
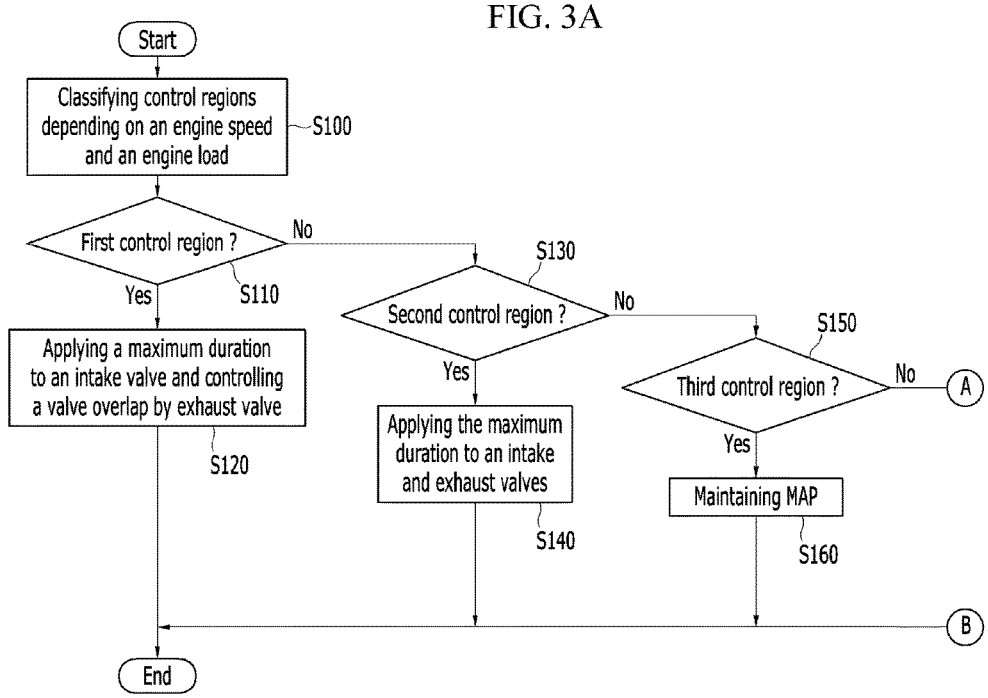
FIG. 3A and FIG. 3B are flowcharts showing a method for controlling valve timing of a continuous variable valve duration engine according to one form of the present disclosure.
Figure 3B:
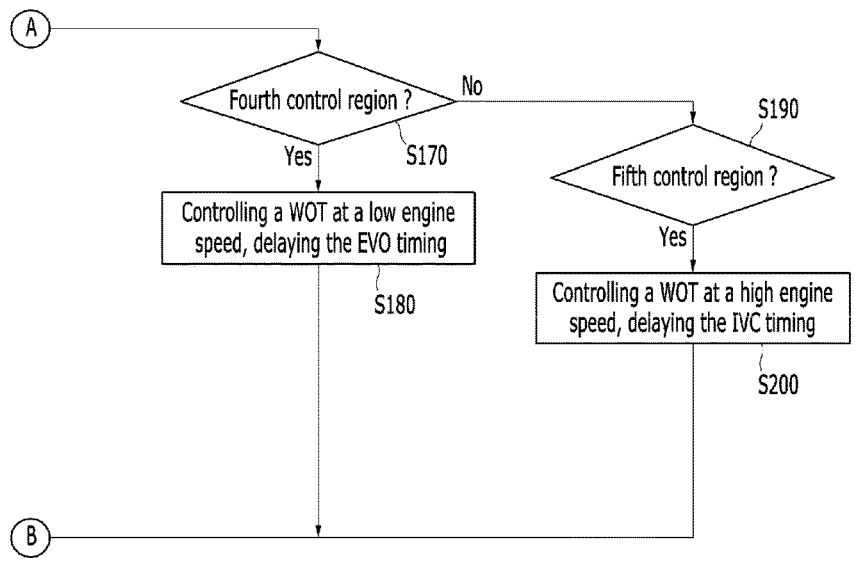

FIG. 3A and FIG. 3B are flowcharts showing a method for controlling valve timing of a continuous variable valve duration engine.

Figure 4A:
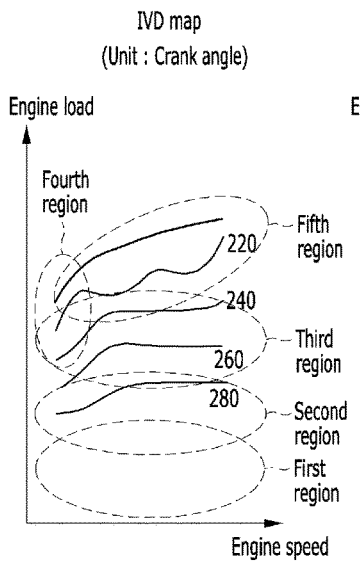
FIGS. 4A-4C are graphs showing duration, opening timing, and closing timing of an intake valve depending on an engine load and an engine speed according to one form of the present disclosure.
Figure 4B:
Figure 4C:
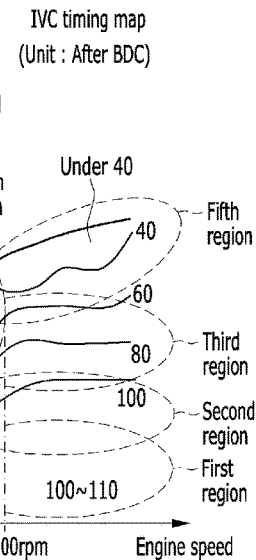
Figure 5A:
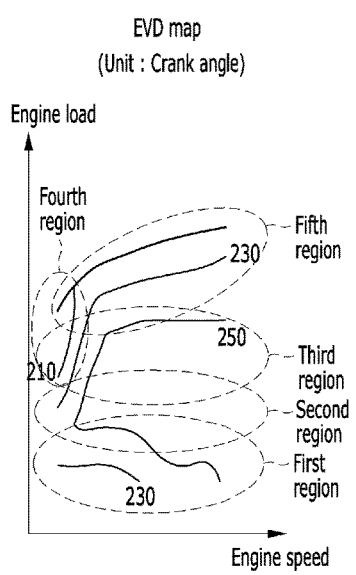
FIGS. 5A-5C are graphs showing duration, opening timing, and closing timing of an exhaust valve depending on an engine load and an engine speed according to one form of the present disclosure.
Figure 5B:
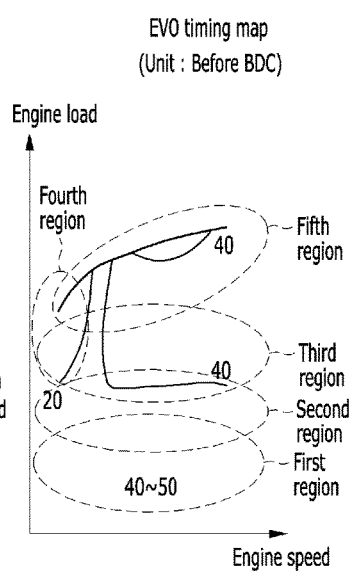
Figure 5C:
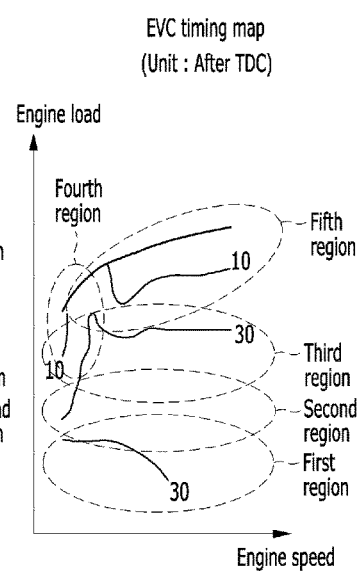

FIGS. 4A-4C are graphs showing duration, opening timing, and closing timing of an intake valve depending on an engine load and an engine speed, and FIGS. 5A-5C are graphs showing duration, opening timing, and closing timing of an exhaust valve depending on an engine load and an engine speed.

As shown in FIG. 3A and FIG. 3B, a method for controlling valve timing of a continuous variable valve duration engine starts with classifying a plurality of control regions depending on an engine speed and an engine load by the controller 30 at step S100.

The control regions will be described with reference to FIG. 4A to FIG. 5C. The first to firth control regions are indicated in the FIG. 4A to FIG. 5C.

The controller 30 may classify control regions as a first control region when the engine load is less than a first predetermined load, a second control region when the engine load is greater than or equal to the first predetermined load and less than a second predetermined load, and a third control region when the engine load is greater than or equal to the second predetermined load and less than a third predetermined load. In addition, the controller 30 may classify control regions as a fourth region when the engine load is greater than or equal to the second predetermined load and the engine speed is less than a predetermined speed, a fifth region when the engine load is greater than or equal to the third predetermined load and the engine speed is greater than or equal to the predetermined speed.

Meanwhile, referring to FIG. 4A to FIG. 5C, a crank angle is marked in an intake valve duration (IVD) map and an exhaust valve duration (EVD) map, which indicating the opening time of the intake valve and exhaust valve. For example, regarding the IVD map in FIG. 4A, a curved line written as a number 220 at inner side of the fifth region means that the crank angle is approximately 220 degrees. Although not shown in the drawing, the crank angle which is approximately more than approximately 220 degrees and less than approximately 240 degrees is positioned between the curved line of the number 220 and the curved line of the number 240.

In addition, a unit of number designated in an intake valve opening (IVO) timing map is before a top dead center (TDC), a unit of number designated in an intake valve closing (IVC) timing map is after a bottom dead center (BDC), a unit of number designated in an exhaust valve opening (EVO) timing map is before BDC, and a unit of number designated in an exhaust valve closing (EVC) map is after TDC.

Each region and curved line in FIG. 4A to FIG. 5C are an exemplary form of the present disclosure, it may be modified within the technical idea and scope of the present disclosure.

Referring to FIGS. 3A to 5C, the control regions are classified according to the engine speed and load in the step of S100. After that, the controller 30 determines whether the engine state is under the first control region at step S110.

In the step of S110, if the engine load is less than a first predetermined load, the controller 30 determines that the engine state is under the first control region. At this time, the controller 30 applies a maximum duration to the intake valve and controls the valve overlap between the exhaust valve and intake valve at step S120. The valve overlap is a state where the intake valve is opened and the exhaust valve is not closed yet.

In other words, when the engine is under low load, then the controller 30 may control the intake valve closing (IVC) timing to be positioned at LIVC (Late Intake Valve Closing; an angle of approximately 100-110 degrees after BDC; referring to FIGS. 4A-4C) by applying the maximum duration to the intake valve since the intake valve opening (IVO) is fixed. As shown in FIGS. 4A-4C, the IVC timing may be controlled to an angle of approximately 100 to 110 degrees after a bottom dead center (BDC) in the IVC timing map.

Also, the controller 30 may control the EVC timing to move in a direction after a top dead center (TDC) such that the EVC timing is set at a maximum value within range of combustion stability. Meanwhile, as the valve overlap is increased, the fuel consumption is cut, whereas the combustion stability is deteriorated. Accordingly, properly setting the valve overlap is desired. However, according to the present disclosure, it is possible to get highly improved fuel-efficiency by setting a desirable valve overlap up, which fixing the EVO timing and controlling the EVC timing to be set up at a maximum value within sustainable combustion stability. The timing value may be determined by a predetermined map. As shown in FIGS. 5A-5C, the EVO timing may be controlled at an angle of approximately 40 to 50 degrees before a bottom dead center (BDC).

When the current engine state does not belong to the first control region at the step S110, the controller 30 determines whether the current engine state belongs to the second control region at step S130.

In the step of S130, if the engine load is more than or equal to the first predetermined load and less than the second predetermined load, the controller 30 determines that the engine state is under the second control region. At this time, the controller 30 controls both the intake valve and exhaust valve respectively having the maximum duration consistently at step S140.

The controller 30 may control the EVC timing to be retarded as the engine load is increased in order that the exhaust valve reaches the maximum duration. Herein, the controller 30 is in the process of fixing the IVO timing and IVC timing for applying the maximum duration to the intake valve in the first control region, thereby controller 30 may apply the maximum duration to the exhaust valve such that the difference between the atmospheric pressure and the pressure of the intake manifold is maintained at a predetermined value. For example, manifold absolute pressure (MAP), which is the difference between atmospheric pressure and pressure of the intake manifold, may be approximately 950 hPa.

When the current engine state does not belong to the second control region at the step S130, the controller 30 determines whether the current engine state belongs to the third control region at step S150.

In the step of S150, if the engine load is more than or equal to the second predetermined load and less than the third predetermined load, the controller 30 determines that the engine state is under the third control region. At this time, the controller 30 controls the MAP to be maintained consistently at step S160.

In other words, the controller 30 applies the maximum duration to the intake valve and the exhaust valve and controls the MAP to be maintained consistently in the second control region. And after, when the engine state is under the third control region as the engine load is increased, the controller 30 may advance both the EVC timing and IVC timing and control the MAP to be maintained consistently.

Referring to FIGS. 4A to 5C, the IVC timing and the EVC timing are advanced in the third region so as to maintain the MAP. In this case, if the EVC timing is advanced in a state that the IVO timing is fixed, then the valve overlap may be shorten, thereby the knocking may be decreased.

When the current engine state does not belong to the third control region at the step S150, the controller 30 determines whether the current engine state belongs to the fourth control region at step S170.

If the engine load is greater than or equal to the second predetermined load and the engine speed is less than a predetermined speed in the S170, the controller 30 determines that the engine state is under the fourth control region. At this time, the controller 30 fully opens a throttle valve (WOT; Wide Open Throttle valve) and retards the EVO timing at step S180.

In the fourth control region, which the engine speed is less than the predetermined speed (e.g., approximately 1500 rpm), normally, the controller may retard the EVO timing to avoid an exhaust interference. However, it is difficult to generate scavenging effect since the IVO timing is fixed.

When the current engine state does not belong to the fourth control region at the step S170, the controller 30 determines whether the current engine state belongs to the fifth control region at step S190.

In the S190, if the engine load is greater than or equal to the third predetermined load and the engine speed is greater than or equal to the predetermined speed, then the controller 30 determines that the engine state is under the fifth control region. At this time, the controller 30 fully opens a throttle valve (WOT; Wide Open Throttle valve) and controls the IVC timing to be retarded at step S200.

Since the engine speed is greater than or equal to the predetermined speed (e.g., approximately 1500 rpm) in the fifth control region and the scavenging may be disappeared, the controller 30 may control the IVC timing as an optimal value. Referring to FIGS. 4A-4C, the IVC timing may be gradually retarded from an angle of approximately 20 degrees when the engine speed is less then predetermined speed (low speed) to angle of approximately 60 degrees as the engine speed is increased.

However, the IVO timing may be fixed in one form, thereby the valve underlap is not generated. Therefore, the engine performance may be deteriorated in a medium speed (e.g., approximately 1500-3000 rpm)

As described above, according to the present disclosure, duration and timing of the continuous variable valve are simultaneously controlled, so the engine may be controlled under desirable conditions.

That is, since opening timing and closing timing of the intake valve and the exhaust valve are appropriately controlled, the fuel efficiency under a partial load condition and engine performance under a high load condition are improved. In addition, a starting fuel amount may be reduced by increasing a valid compression ratio, and exhaust gas may be reduced by shortening time for heating a catalyst.

Moreover, even if the continuously variable valve timing device is sipped, the power performance may be maintained with a low cost.

While this present disclosure has been described in connection with what is presently considered to be practical forms, it is to be understood that the present disclosure is not limited to the disclosed forms. On the contrary, it is intended to cover various modifications and equivalent arrangements included within the spirit and scope of the present disclosure.

What is claimed is:

1. A method for controlling valve timing provided with a continuous variable valve duration device disposed on an intake valve side, and with a continuous variable valve duration device and continuous variable valve timing device disposed on an exhaust valve side, the method comprising:
    classifying, by a controller, a plurality of control regions depending on an engine speed and an engine load,
    wherein the plurality of control regions comprises:
        a first control region determined by the controller when the engine load is less than a first predetermined load,
        a second control region determined by the controller when the engine load is greater than or equal to the first predetermined load and less than a second predetermined load,
        a third control region determined by the controller when the engine load is greater than or equal to the second predetermined load and less than a third predetermined load,
        a fourth control region determined by the controller when the engine load is greater than or equal to the second predetermined load and the engine speed is less than a predetermined speed, and
        a fifth control region determined by the controller when the engine load is greater than or equal to the third predetermined load and the engine speed is greater than or equal to the predetermined speed;
    applying, by the controller, a maximum duration to an intake valve and controlling a valve overlap by using an exhaust valve in the first control region,
    applying, by the controller, the maximum duration to the intake valve and exhaust valve in the second control region;
    controlling, by the controller, a manifold absolute pressure (MAP) of an intake manifold to be maintained consistently in the third control region;
    controlling, by the controller, a wide open throttle valve (WOT) and retarding an exhaust valve opening (EVO) timing in the fourth control region; and
    controlling, by the controller, a wide open throttle valve (WOT) and retarding an intake valve closing (IVC) timing in the fifth control region.

2. The method of claim 1, wherein when the first control region is determined, the controller fixes the EVO timing and controls an exhaust valve closing (EVC) timing to be set up at a maximum value as much as combustion stability is maintained so as to limit a valve overlap.

3. The method of claim 1, wherein when the second control region is determined, the controller controls an exhaust valve closing (EVC) timing to be retarded as the engine load is increased so that the exhaust valve reaches the maximum duration.

4. The method of claim 1, wherein when the third control region is determined, the controller advances both an exhaust valve closing (EVC) timing and the intake valve closing (IVC) timing so as to maintain the MAP consistently when the engine load is increased.

5. A system for controlling valve timing of a continuous variable valve duration engine, the system comprising:
    a data detector configured to detect data related to a running state of a vehicle;
    a camshaft position sensor configured to detecting a position of a camshaft;
    an intake continuous variable valve duration (CVVD) device configured to control an opening time of an intake valve of the engine;
    an exhaust continuous variable valve duration (CVVD) device configured to control an opening time of an exhaust valve of the engine;
    an exhaust continuous variable valve timing (CVVT) device configured to control an opening and closing timing of the exhaust valve of the engine; and
    a controller configured to classify a plurality of control regions depending on an engine speed and an engine load based on signals from the data detector and camshaft position sensor, and configured to control the intake CVVD device, the exhaust CVVD device, and the exhaust CVVT device according to the plurality of control regions,
    wherein the plurality of control regions comprises:
        a first control region determined by the controller when the engine load is less than a first predetermined load;

a second control region determined by the controller when the engine load is greater than or equal to the first predetermined load and less than a second predetermined load;

a third control region determined by the controller when the engine load is greater than or equal to the second predetermined load and less than a third predetermined load;

a fourth control region determined by the controller when the engine load is greater than or equal to the second predetermined load and the engine speed is less than a predetermined speed; and a fifth control region determined by the controller when the engine load is greater than or equal to the third predetermined load and the engine speed is greater than or equal to the predetermined speed, wherein the controller applies a maximum duration to the intake valve and controls a valve overlap by using the exhaust valve in the first control region, applies the maximum duration to the intake and exhaust valves in the second control region, controls a manifold absolute pressure (MAP) in an intake manifold to be maintained consistently in the third control region, controls a wide open throttle valve (WOT) and controls an exhaust valve opening (EVO) timing to be retarded in the fourth control region, controls a wide open throttle valve (WOT) and controls an intake valve closing (IVC) timing to be retarded in the fifth control region.

6. The method of claim 5, wherein the controller fixes the EVO timing and controls an exhaust valve closing (EVC) timing to be set up at a maximum value as much as combustion stability is maintained so as to limit a valve overlap in the first control region.

7. The method of claim 5, wherein the controller controls an exhaust valve closing (EVC) timing to be retarded as the engine load is increased so that the exhaust valve reaches the maximum duration in the second control region.

8. The method of claim 5, wherein the controller advances both an exhaust valve closing (EVC) timing and the intake valve closing (IVC) timing so as to maintain the MAP consistent when the engine load is increased in the third control region.

* * * * *